(12) United States Patent
Govindarajalu

(10) Patent No.: US 7,509,533 B1
(45) Date of Patent: Mar. 24, 2009

(54) METHODS AND APPARATUS FOR TESTING FUNCTIONALITY OF PROCESSING DEVICES BY ISOLATION AND TESTING

(75) Inventor: Hariprakash Govindarajalu, Thirubuvanam (IN)

(73) Assignee: Sun Microsystems, Inc., Palo Alto, CA (US)

( * ) Notice: Subject to any disclaimer, the term of this patent is extended or adjusted under 35 U.S.C. 154(b) by 549 days.

(21) Appl. No.: 10/610,182

(22) Filed: Jun. 30, 2003

(51) Int. Cl.
*G06F 11/00* (2006.01)

(52) U.S. Cl. .............................. 714/30; 714/34; 714/37

(58) Field of Classification Search .................... 714/25, 714/27, 30, 34, 37
See application file for complete search history.

(56) References Cited

U.S. PATENT DOCUMENTS

| | | | | |
|---|---|---|---|---|
| 4,667,288 | A * | 5/1987 | Keeley et al. .................. | 714/25 |
| 5,113,523 | A * | 5/1992 | Colley et al. .................. | 712/12 |
| 5,325,518 | A * | 6/1994 | Bianchini, Jr. ................ | 714/31 |
| 5,535,165 | A * | 7/1996 | Davis et al. ................... | 365/201 |
| 5,673,276 | A * | 9/1997 | Jarwala et al. ............... | 714/727 |
| 5,925,144 | A * | 7/1999 | Sebaa ........................... | 714/733 |
| 5,954,824 | A * | 9/1999 | Cherichetti et al. ........... | 714/28 |
| 6,018,815 | A * | 1/2000 | Baeg ............................ | 714/726 |
| 6,321,329 | B1 * | 11/2001 | Jaggar et al. ................. | 712/227 |
| 6,327,681 | B1 * | 12/2001 | Yamagishi et al. ........... | 714/718 |
| 6,353,563 | B1 * | 3/2002 | Hii et al. ....................... | 365/201 |
| 6,360,333 | B1 * | 3/2002 | Jansen et al. .................. | 714/25 |
| 6,370,657 | B1 * | 4/2002 | Jansen et al. .................. | 714/23 |
| 6,532,215 | B1 * | 3/2003 | Muntz .......................... | 370/242 |
| 6,571,359 | B1 * | 5/2003 | Padwekar et al. ............. | 714/40 |
| 6,636,825 | B1 * | 10/2003 | Malladi et al. ............... | 702/118 |
| 6,654,707 | B2 * | 11/2003 | Wynn et al. .................. | 702/186 |
| 6,973,607 | B2 * | 12/2005 | Baier et al. ................... | 714/724 |
| 7,039,832 | B2 * | 5/2006 | Arimilli et al. ................ | 714/34 |
| 7,206,966 | B2 * | 4/2007 | Barr et al. ..................... | 714/25 |
| 2002/0157042 | A1 * | 10/2002 | Krech et al. .................. | 714/45 |
| 2003/0191996 | A1 * | 10/2003 | Mukherjee et al. .......... | 714/724 |
| 2004/0064770 | A1 * | 4/2004 | Xin .............................. | 714/726 |

* cited by examiner

*Primary Examiner*—Robert Beausoliel
*Assistant Examiner*—Elmira Mehrmanesh
(74) *Attorney, Agent, or Firm*—Brooks Kushman P.C.

(57) ABSTRACT

A computerized device having a first processing device, a second processing device, and an interconnection mechanism allowing communication between the first and second processing devices, provides a mechanism for testing a processing device by performing the isolation and testing operations of operating the first processing device in a normal processing mode and transitioning the first processing device from the normal processing mode to an isolated processing mode. The device performs a test process on the first processing device while in isolated processing mode to test functional portions of the first processing device. If operation of the test process produces an error in a functional portion of the first processing device, the test process notifies a control process on a second processing device of the error in the functional portion of the first processing device in which the test process produced an error. If operation of the test process does not produce an error in the functional portions of the first processing device, the device transitions the first processing device from the isolated processing mode back to the normal processing mode upon completion of the test process. The process can be repeated periodically on all processors in a device at an interval that is less than an average mean time between failures of the processing devices.

35 Claims, 7 Drawing Sheets

METHODS AND APPARATUS FOR TESTING FUNCTIONALITY OF PROCESSING DEVICES BY ISOLATION AND TESTING

BACKGROUND

Computerized devices typically include a startup testing procedure that occurs during a power-up or boot-up operation of the computerized device in order to test various hardware components within the computerized device. As an example, a typical personal computer or workstation that includes one or more central processing units, a memory system, various peripheral devices and other electronic components often includes a self-testing program built-in to firmware within the computerized device. Upon application of power to the computerized device, the computerized device automatically activates the self testing program prior to other operations in the device in order to perform a series of operational and functional tests to ensure that the hardware and firmware components within the computerized device do not contain logic, processing or other operational or functionality errors or problems that would cause improper operation of the computerized device if such problems were to go undetected.

As a specific example, most personal computer systems and workstations provide automatic operation of a Random Access Memory (RAM) test immediately upon power up of the device. The memory test verifies the operational integrity and amount of memory installed within the computer system. As another example, many computer systems perform a brief microprocessor or central processing test upon power up in order to test limited functionality of various processing circuits and on-board cache memory within the processor(s) installed in the computer system prior to loading and starting-up or "booting" the operating system that runs within the computer system. Microprocessor testing that is performed upon start up of conventional computerized devices can include operation of a built-in self test (BIST) that provides single stuck-at fault coverage of microcode within the microprocessor and large logic arrays (e.g., Field Programmable Gate Arrays), as well as testing of the instruction cache, data cache, Translation Lookaside Buffers (TLBs), and Read Only Memory (ROM) within the computerized device.

SUMMARY

Conventional mechanisms and techniques for testing the operational integrity of components within computerized devices suffer from a variety of deficiencies. In particular, many conventional computerized devices operate non-stop without being power cycled for extended periods of time after the initial power-up and test. By way of an example, a typical server computer system coupled to a network such as the Internet may operate for several days, weeks or months after its initial power-on self test (POST) operation in order to provide around-the-clock service of files or other data to other computer systems requesting access to the server computer system over the network. Components such as memory, microprocessors or other circuitry within such computerized devices operating for extended periods of time can suffer from faults or other errors during their normal operation that compromises the operational integrity of all or a portion of that component. As an example, a computational circuit within a processor may experience a fault such as a transistor short after the processor has been in operation for extended periods of time due to overheating or other environmental conditions. The fault may be minor in nature causing an occasional miscalculation in data output by the processor. Since a conventional computerized device containing such a faulted processor performs processor testing only upon startup of the computerized device, identification of the faulty processor component during normal processing mode (i.e., after the operating system and user applications are up and running) will not take place. Instead, the fault may not be detected until the next power cycle operation of the computerized device. Accordingly, the undetected processor fault may continue to introduce errors within certain processing operations of the conventional computerized device while being undetected for a long period of time.

Another deficiency of conventional mechanisms for testing of components within computerized devices is that power-up component testing is limited in its extensiveness since POST testing is required to be performed in a relatively short amount of time. Since users of computerized device do not want to wait for an extensive period of time for the power-up process to complete, conventional power-up testing of components is not comprehensive. Rather, the objective of conventional power-up component testing operations is to quickly performed a general or high level test of the main functionality of the processing components in the computerized device in order to allow the device to quickly startup operation and enter its normal processing mode for execution of the operating system and associated user applications. If extensive testing were performed of components during a startup operation prior to normal processing mode, the startup operation itself could take an exceedingly long amount of time and would make the computerized devices unacceptable for use in many commercial applications.

In addition, conventional extensive diagnosis and testing programs that perform a robust analysis and testing of the entire functionality of processing components such as central processing units and memory systems are quite large in size and consume significant amounts of storage space. Accordingly, conventional full-analysis testing programs are limited for use in repair facilities and are not incorporated into routine use within computer systems. Start-up testing programs such as POST are limited to small and relatively quick non-extensive testing operations and are only performed during startup. As noted above, if components experience a fault any time after start-up testing has completed, such faults may go undetected for long periods of time and may introduce minor errors in processing for extended periods before those faults are discovered.

Embodiments of the invention significantly overcome such deficiencies and provide mechanisms and techniques for automatically and periodically performing extensive testing of processing devices such as microprocessors, central processing units, controllers, computational circuitry or other components within computerized devices after such devices have entered normal processing mode (e.g., after startup of the device is complete). Embodiments of the invention are based in part on the observation that failures of components such as processing devices operating within computerized devices can occur during runtime operation of such devices when the computerized device is operated for extended periods of time. In particular, in computerized devices such as multiprocessor server computer systems that operate for extended periods of time (e.g., days, weeks or months) without being shut down and restarted, a fault, circuit short or other error may occur within one of the processing devices of such a computer system and the fault may introduce minor computational errors into data processed by the computerized device. As an example, a small fault or processing error within an arithmetic logic unit in a microprocessor may introduce, for example, an inconsistency in performing certain types of calculations. Using conventional power on self-testing technologies, if the fault comes into existence during operation of the microprocessor at any time after power-up of the microprocessor has completed, the error will remain undetected until the next power cycle. However, embodiments of the invention provide for automated periodic testing of processing devices within the computerized device after the initial startup of the computerized device. Such testing can take place at periodic intervals during normal processing mode of the computerized device, or can occur in response to a test begin event such as a specific time.

Generally, embodiments of the invention operate as a pair of processes referred to herein as a control process and a test process. The control process operates on one microprocessor within the computerized device in order to isolate another microprocessor (to be tested) in an off-line state for a period of time so that the off-line microprocessor no longer executes user applications or other non-test processes. During this off-line time period, the control process invokes execution of a test process within the off-line processing device. The test process can perform extensive testing of some or all of the functional portions of the off-line processing device in order to detect any faults that may exist within that processing device. The test process can notify the control process executing on the other processor of any errors that it may find within the off-line processing device and can instruct the control process as to whether or not the off-line processing device can return to online processing mode in order to continue operation within the computerized device. Upon completion of the test process, the control process can cause the off-line processing device to transition back to normal processing mode in order to again begin execution of user programs and applications.

In a multiprocessor computer system, the processing of embodiments of the invention can be performed at periodic intervals that are less than the mean time between failures for processing devices of the type operating within the computerized device. The control process can execute on each of the processing devices within the computerized device in a schedule or ordered manner (e.g., round robin) such that all processing devices are periodically tested in this manner in order to detect faults that may occur during run-time operation of the computerized device. As a result, in computerized devices that remain operational for extended periods of time, embodiments of the invention operate to detect failures or faults within processing devices well in advance of having to shutdown and then restart the device, so that any errors introduced by such faults can be quickly detected and the offending microprocessor can be isolated from use. As a result, errors only introduce minimal disruption into operation of the computerized device.

More specifically, embodiments of the invention operate in a multiprocessor computerized device having at least a first processing device and a second processing device. An interconnection mechanism such as a bus or other circuitry allows communication between the first and second processing devices. Embodiments of the invention are operable to test processing devices by operating the first processing device in a normal processing mode and then transitioning the first processing device from the normal processing mode to an isolated processing mode. Embodiments of the invention perform a test process on the first processing device while in isolated processing mode to test functional portions of the first processing device. If operation of the test process produces an error in a functional portion of the first processing device, embodiments of the invention cause the test process to notify a control process on a second processing device of the error in the functional portion of the first processing device in which the test process produced the error. If operation of the test process does not produce an error in the functional portions of the first processing device, embodiments of the invention transition the first processing device from the isolated processing mode back to the normal processing mode upon completion of the test process to again service non-test processes.

Testing of a processing device in a multiprocessor computerized device can occur at periodic intervals after startup of the computerized device while the remainders of the processing devices in the machine remain available for use and execution of programs such as user applications. By periodically testing essential system components of the computerized device such as the central processing unit at intervals that are less than or equal to the average mean time between failures of such processing devices, early detection of errors in such processing devices can be achieved. In addition, in a multiprocessor system, since all of the central processing units are used to share the system load, one of the central processing units at time can be periodically taken off-line and can be tested and returned for use in normal processing mode within the system without significantly reducing the overall performance of the computerized device. Accordingly, embodiments of the invention have minimal impact on the performance of the computerized device as a whole.

In order to avoid interference from conditions such as context switching, embodiments of the invention operate a control process on a non-isolated processing device in order to isolate the processing device under test so that a system scheduler (e.g., in the operating system operating in the computerized device) does not schedule processes to the isolated processing device. In addition, the control process (or the test process) can migrate non-test processes off of the isolated processing device to other processing devices and can redirect interrupts to those non-test processes now operating on the other non-isolated processing devices in the computerized device. Once the processing device is rendered off-line by controlling process, the test process may be dispatched on the processing device operating in isolated processing mode. Once testing is complete, the test process can signal the controlling process on the non-isolated processing device to bring the isolated processing device back to normal processing mode in which user processes can be executed.

Other embodiments of the invention include a multiprocessor computerized device configured with software and/or circuitry (e.g., first and second processing devices operating control and test processes as explained herein) to process any or all of the method operations disclosed herein as embodiments of the invention. Still other embodiments of the invention include software programs to perform the method embodiment steps and operations summarized above and disclosed in detail below. One such embodiment comprises a computer program product that has a computer-readable medium including computer program logic encoded thereon that, when performed in a multiprocessor computerized device having at least a first processing device and a second processing device and an interconnection mechanism such as a bus or other circuitry that allows communication between the first and second processing devices, programs one processor to perform the test operations and another processor to perform the control operations disclosed herein as embodiments of the invention to carry out testing of the processing devices in the computerized device. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips or as an Application Specific Integrated Circuit (ASIC). The software or firmware or other such configurations can be installed onto the computerized device (e.g., an ASIC in an Infiniband channel adapter card) to cause the computerized device to perform the techniques explained herein as embodiments of the invention.

It is to be understood that the system of the invention can be embodied strictly as a software program, as software and hardware, or as hardware alone. Example embodiments of the invention may be implemented within computer systems, processors, and computer program products and/or software applications manufactured by Sun Microsystems Inc. of Palo Alto, Calif., USA.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION

Figure 1:
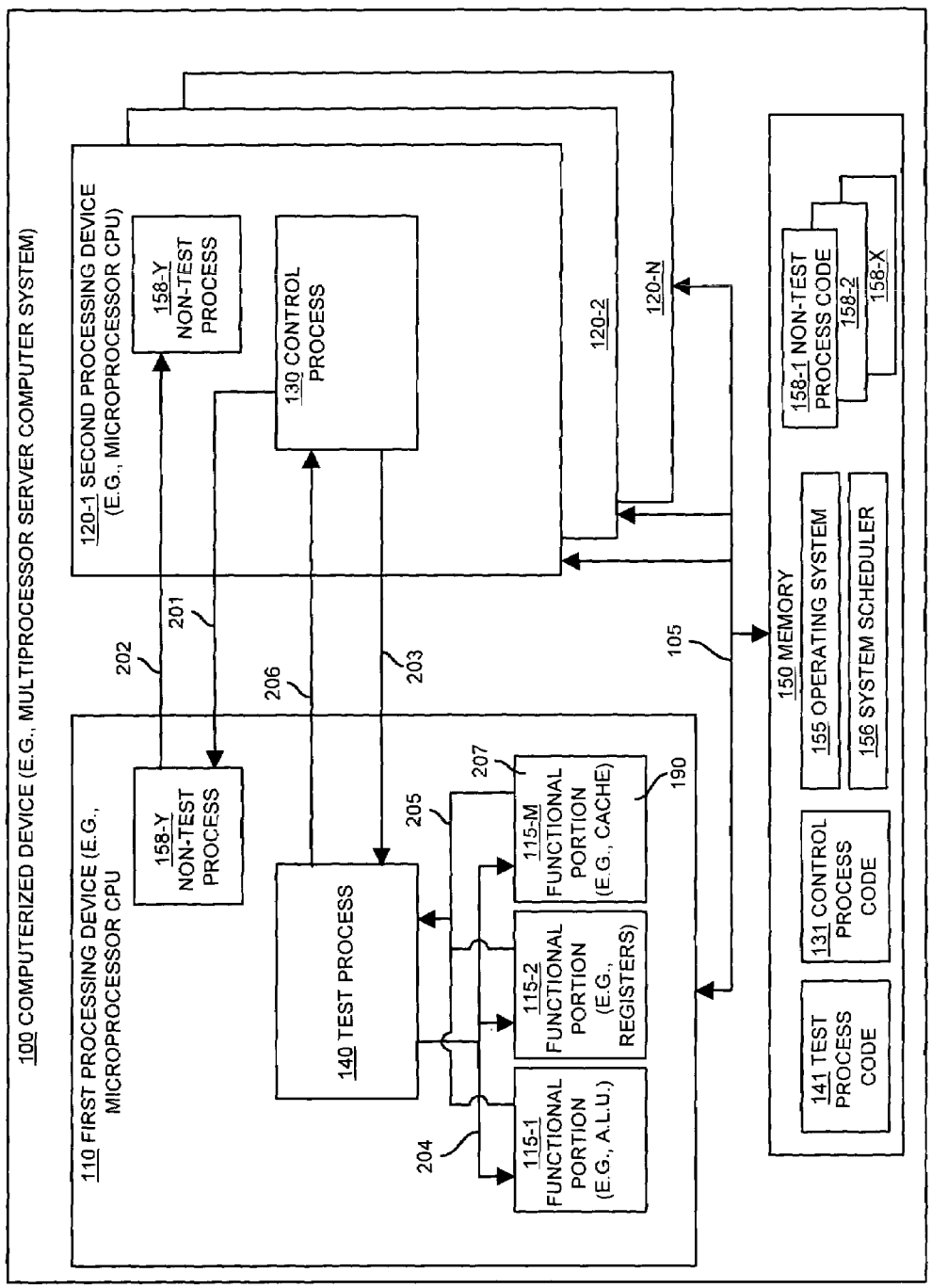
FIG. 1 illustrates a computerized device including first and second processing devices configured according to one example embodiment of the invention to perform testing of the first processing device.

FIG. 1 illustrates an example of a computerized device 100 configured in accordance with one example embodiment of the invention. The computerized device 100 includes an interconnection mechanism 105 such as a data bus, backplane or other circuitry that interconnects a first processing device 110, at least one second processing device 120 (120-1 through 120-N in this example) and a memory 150. The processing devices 110 and 120 represent operational processors or circuitry within the computerized device 100 such as central processing units, microprocessors, controllers or other such devices that can execute logic or processing operations in order to perform various tasks. As an example, the computerized device 100 may be a multiprocessor server computer system and each processing device 110 and 120 may represent the collection of processors installed for operation within the computerized device 100 for concurrent execution of programs and processes within the computer system 100.

The memory 150 may be any type of computer readable medium such as Random Access Memory (RAM), Read Only Memory (ROM) or any variant thereof or may be a removable computer readable medium such as electronic, magnetic or optical disk or other memory storage media. The memory 150 is encoded with logic instructions, data and/or code (e.g., object code or source code) that includes, in this example, control process code 131, test process code 141, an operating system 155 and associated system scheduler code 156, and a plurality of non-test processes 158 (code sections 158-1 through 158-X). Under control of the operating system 155 and scheduler 156, the processing devices 110 and 120 are able to access the memory 150 over the interconnection mechanism 105 in order to execute, run, interpret or otherwise perform the various code portions within the memory 150 in order to form corresponding processes within the processing devices 110 and 120. As an example, the control process 130 within the second processing device 120-1 represents a run-time instantiation of the control process code 131. Likewise, the test process 140 executing within the first processing device 110 represents a run-time instantiation of the test process code 141 within the memory 150.

The first processing device 110 includes a plurality of functional portions 115-1 through 115-M. Each functional portion 115 represents an operational section of the processing device 110. In this example, the functional portion 115-1 represents an arithmetic logic unit (ALU), the functional portion 115-2 represents one or more registers of the first processing device 110 and the functional portion 115-M represents one or more onboard cache memory systems associated with the first processing device 110. It is to be understood that these example functional portions 115-1 through 115-M are shown by way of example only and there may be other functional portions of the first processing device 110. Likewise, the other processing devices 120-1 through 120-N can include similar functional portions equivalent to those contained within the first processing device 110 that are not shown in this illustration due to drawing space limitations.

Each processing device 110 and 120 can operate in a normal processing mode during which the system scheduler 156 associated with the operating system 155 schedules execution of non-test processes 158 to perform on the processing devices 110 and 120. As an example, the system scheduler 156 may schedule and cause execution of the non-test process 158-Y on the first processing device 110 during normal processing mode of the first processing device 110. The non-test processes 158 represent, for example, user application processes, user threads or operating system threads.

Generally, according to embodiments of the invention, at periodic intervals (to be explained), the control process 130 can execute on one processing device such as the second processing device 120-1 in this example and can cause the first processing device 110 to transition from the normal processing mode to an isolated processing mode in which all non-test processes 158 are migrated off of the first processing device 110. Thereafter, the control process 130 can invoke the test process 140 in order to test operation of the various functional portions 115 of the first processing device 110. As will be explained herein, the test process 140 can perform a variety of robust functional portion processing tests in order to ensure correct operation of each functional portion 115. If the test process 140 detects a fault or error with one or more of the functional portions 115, the test process can report this information to the control process 130.

The test process 140 (or the control process 130, depending upon implementation) can determine, based upon the detected fault of a particular functional portion 115, whether or not the first processing device 110 can continue to be of service within the computerized device 100 in order to again operate in normal processing mode. As an example, if the test process can isolate or disable all or part of the functional portion 115 containing a fault, then the first processing device 110 might continue to be of useful operation for processing non-test processes 158 in normal processing mode within the computerized device 100, without the use of the disabled functional portion 115. After the test process 140 has completed testing each functional portion 115 and assuming no fatal errors were discovered that require complete disabling of the first processing device 110, the test process 140 completes and the control process 130 can transition the first processing device 110 from the isolated processing mode back to a normal processing mode in order to allow the system scheduler 156 to again begin scheduling non-test processes 158 for execution of the first processing device 110.

In this manner, the multiprocessor computerized device 100 can allow the control process 130 executing on the second processing device 120 in normal processing mode to temporarily isolate the first processing device 110 for execution of the test process 140 which can perform exhaustive testing of each functional portion 115 of the first processing device 110. This operation can be repeated for the other processing devices 120-2 through 120-N such that each processing device 110 and 120 operates the test process 140 in order to test each of its respective functional portions 115. Further details of processing operations performed according to embodiments of the invention will now be explained with respect to a flow chart of processing steps shown in FIG. 2.

Figure 2:
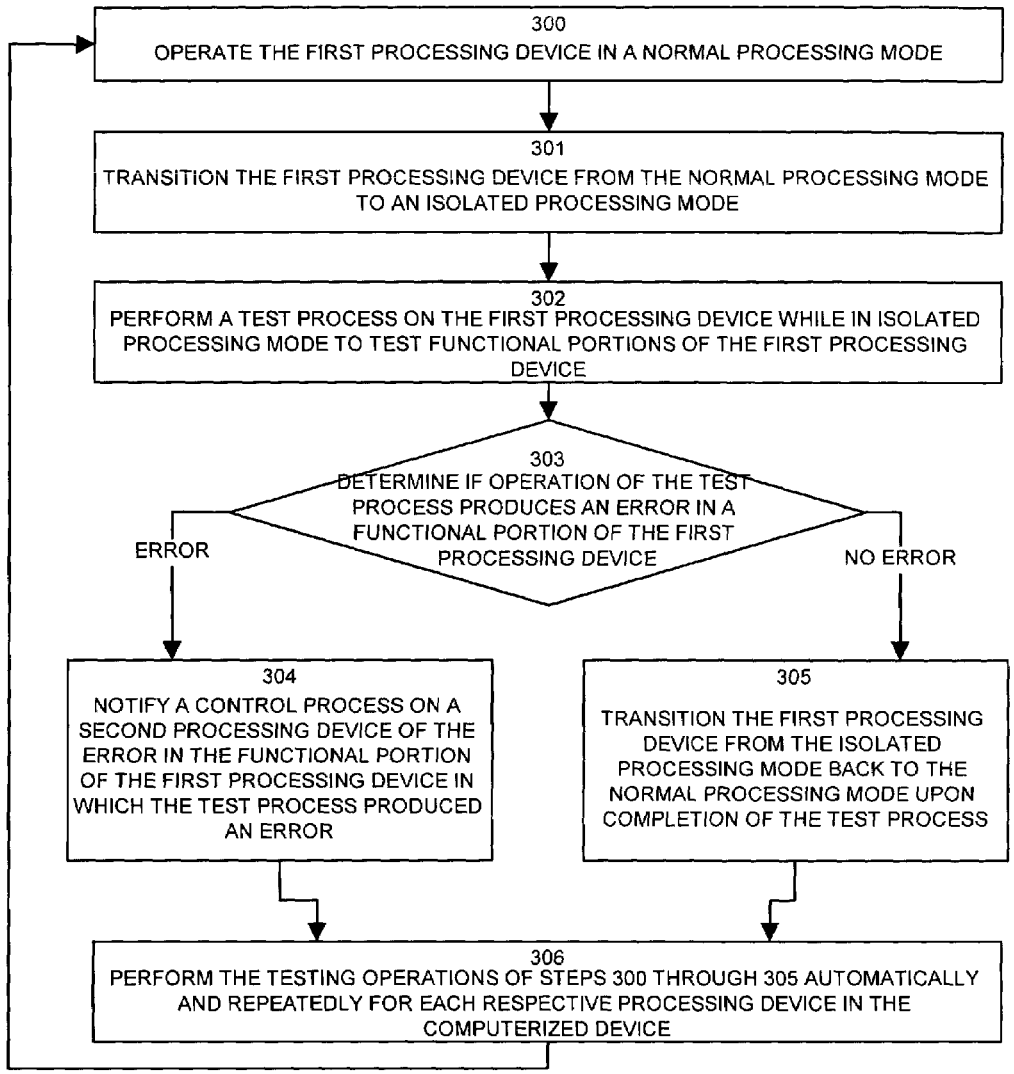
FIG. 2 is a flow chart of processing steps to perform testing of processing devices in a computerized device in accordance with one example embodiment of the invention.

FIG. 2 is a flow chart of processing steps that the computerized device 100 performs according to embodiments of the invention to test processing devices 110 and 120 installed for operation within the computerized device 100. During the description of processing steps shown in FIG. 2, reference will be made to the example computerized device architecture 100 illustrated in FIG. 1.

In step 300, the computerized device 100 operates the first processing device 110 in a normal processing mode. Normal processing mode occurs after conventional power-on self-test (POST) operations are complete and after boot-up of the operating system 155. Typically, normal processing mode includes a period of time in which the first processing device 110 executes one or more non-test processes 158 such as user processes.

In step 301, the computerized device 100 transitions the first processing device 110 from the normal processing mode to an isolated processing mode. The transition from normal processing mode to isolated processing mode can be triggered to occur, depending upon embodiments of the invention, in response to a variety of circumstances as will be explained shortly in step 306. The transition can also include the control process 130 signaling 201 to each non-test process 158 executing on the first processing device 110 to migrate 202 those non-test processes 158 off of the first processing device 110 for execution on other processing devices 120 (120-1 for non-test process 158-Y in the example in FIG. 1).

In step 302, the computerized device 100 performs a test process 140 on the first processing device 110 while in isolated processing mode to test 204 the functional portions 115-1 through 115-M of the first processing device 110. The control process 130 can invoke 203 the test process 140 once the transition of the first processing device 110 to isolated processing mode is complete. Specific details of testing 204 of the various functional portions 115 will be explained later in more detailed flow charts concerning operations of specific embodiments of the invention. Generally however, as noted above, the test process 140 is configured to test 204 the various functional portions 115 such as the arithmetic logic unit, register sets, on-board cache memory systems and other components of the processing device 110 in order to detect 205 if such functional portions 115 are operating with or without fault(s).

In step 303, the computerized device 100 determines if operation of the test process 140 produces an error 190 in a functional portion 115 of the first processing device 110. The error 190 may be minor or severe depending, for example, on which particular functional portion 115 contains the error or fault 190 and may also be dependent upon what the particular error or fault is within that functional portion 115. As an example, the error 190 within the cache functional portion 115-M may be a major cache error in which the cache is unusable or may be a minor cache error in which a particular cache line cannot be effectively read by the test process 140.

In step 304, if operation of the test process 140 produces an error 190 in a functional portion 115 (e.g., the on-board cache 115-M in the example shown in FIG. 1) of the first processing device 110, the computerized device 100 notifies 206 the control process 130 executing on a second processing device 120 of the error 190 in the functional portion 115 of the first processing device 110 in which the test process 140 produced an error 190. In this manner, as the test process 140 exercises the various functional portions 115 of the processing device 110, it can report back 206 the status of each functional portion 115.

In step 305, if operation of the test process 140 does not produce an error in the functional portions 115 of the first processing device 110, the computerized device 100 (e.g., the control process 130) transitions the first processing device 110 from the isolated processing mode back to the normal processing mode upon completion of the test process 140. In this manner, once the test process 140 has completed testing of each functional portion 115, assuming no fatal errors were detected which require complete disablement of the first processing device 110, the first processing device 110 can be returned to normal processing mode to again share the load of executing the various non-test processes 158 scheduled for execution within the computerized device 100.

In step 306, the computerized device 100 again performs the testing operations of steps 300 through 305 automatically and repeatedly for each respective processing device 110 and 120-1 through 120-N in the computerized device 100. The control process 130 can perform the testing operations (i.e., steps 300 through 305) according to a testing schedule after routine power-up of the computerized device 100 and after operation in normal processing mode during which time the computerized device 100 has executed non-test programs 158 including, for example, one or more user processes.

In one embodiment of the invention, the control process 130 executes steps 300 through 305 for each processing device 110 and 120 according to a testing schedule that triggers the transition from normal processing mode to isolated processing mode at periodic intervals that are separated by an amount of elapsed time that is less than or equal to the average mean time between failures of the processing devices 110 and 120 (or their equivalents). In this manner, this embodiment of the invention causes the test process to test the capabilities of the functional portions 115 of each processing device 110 and 120 during time intervals that are less than the average time it takes for one of the processing devices 110 or 120 to experience a failure or fault condition within one of its functional portions 115 during continuous operation.

Alternatively, in another embodiment of the invention, the first and second processing devices 110 and 120-1 (or any others) are central processing units of a plurality of central processing units (e.g, through 120-N) in the computerized device 100 that is configured with N+1 central processing units. That is, if the computerized device 100 is said (i.e., is advertised in commercial markets) to include four concurrently operating microprocessors (i.e., N equals 4), the computerized device 110 can actually be configured with five microprocessors (N+1) such that the testing operations are repeatedly performed for each respective central processing unit in a constant manner during a testing time assigned to that central processing unit. Using this configuration, there can be N central processing units concurrently operating in normal processing mode while one processing unit is operating the test process 140 in isolated processing mode at any given time. In this manner, each processing device 110 and 120-1 through 120-N can have a chance to operate in isolated processing mode using, for example, a round robin or other scheduling algorithm that can continually cycle through each processing device such that all processing devices are continually tested for proper functional operation while at the same time the computerized device 100 provides 100 percent levels of service as per customer expectations.

In yet another alternative, the testing operations (i.e., step 300 through 305) of operating in a normal processing mode, transitioning to an isolated processing mode, performing the test process, notifying a control process and transitioning back to the normal processing mode are performed in response to detecting a "test begin event". Examples of a test begin event are a certain scheduled time (e.g., each evening, once a week, etc.), a certain current level of performance such as low-load processing times in which the computerized device 100 is experiencing a relatively low requirement to execute only a few non-test processes 158, or in response to an administrator or software application triggering operation of the control and test processes 140. In this manner, embodiments of the invention can be configured to detect certain events which trigger operation of the control process 130 in conjunction with a test process 140 to test one or more or all the processing devices 110 and 120 within the computerized device 100.

Figure 3:
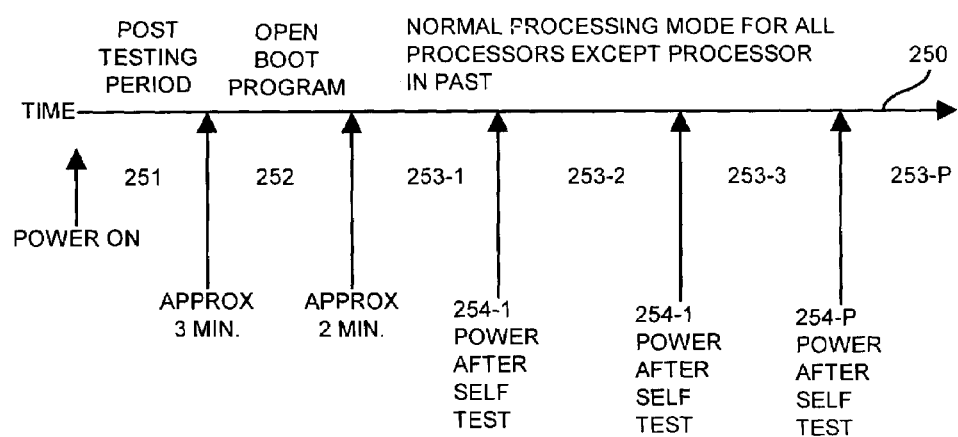
FIG. 3 illustrates a timeline for performing testing of processing devices in accordance with one example embodiment of the invention.

FIG. 3 is a time line that illustrates an example schedule for performance of testing operations (e.g., steps numeral 300 through 305 above) in accordance with one example embodiment of the invention. As illustrated, the time line 250 includes an initial power on self test (POST) period 251 during which the computerized device 100 performs conventional power on self test operations which are limited in their robustness and are required to operate fairly quickly to only test the high level operational capabilities of various components within the computerized device. In this example, the power on self test period lasts approximately three minutes. Thereafter, the computerized device 100 enters into an open boot program time period 252 during which the operating system 155 boots up and prepares for operation of non-test processes 158 within each processing device 110 and 120 in normal processing modes within the computerized device 100. Thereafter, a sequence of safe periods 253-1 through 253-P occur that are each separated by a power after self test (PAST) sequence 254 that comprises the testing operations disclosed above in steps 300 through 306 in accordance with embodiments of the invention. In other words, in this example testing sequence illustrated in FIG. 3, the testing operations of steps 300 through 306 are performed between safe periods of time 253 and are referred to as power after self test (PAST). The safe periods according to one configuration are amounts of time that are less than or equal to the mean time between failures of processing devices 110 and 120 of the type configured within the computerized device 100.

Figure 4:
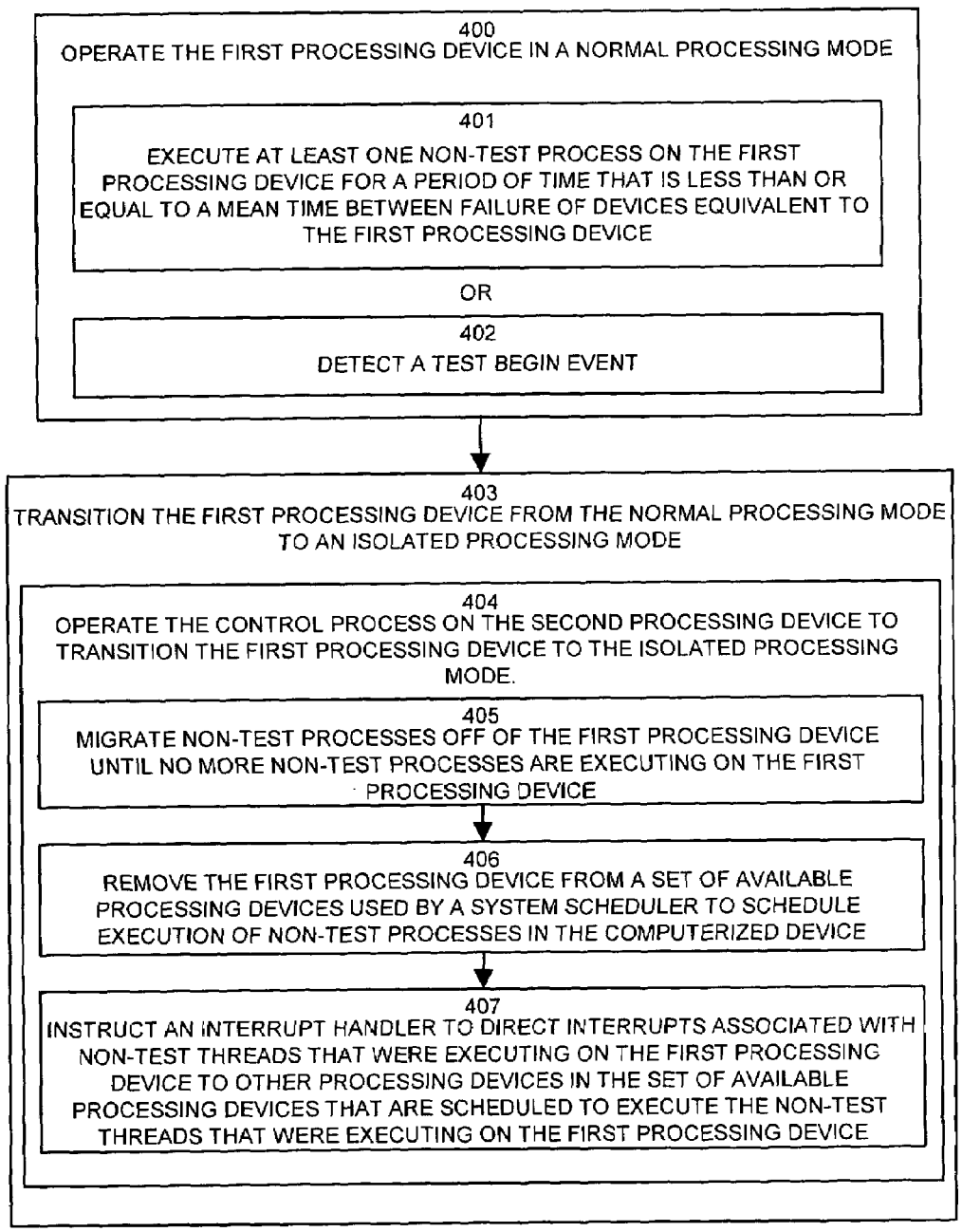
FIGS. 4 through 7 are a flow chart of processing operations performed by a multiprocessor computerized device in accordance with example embodiments of the invention to periodically test processing devices after start-up of the computerized device.
Figure 5:
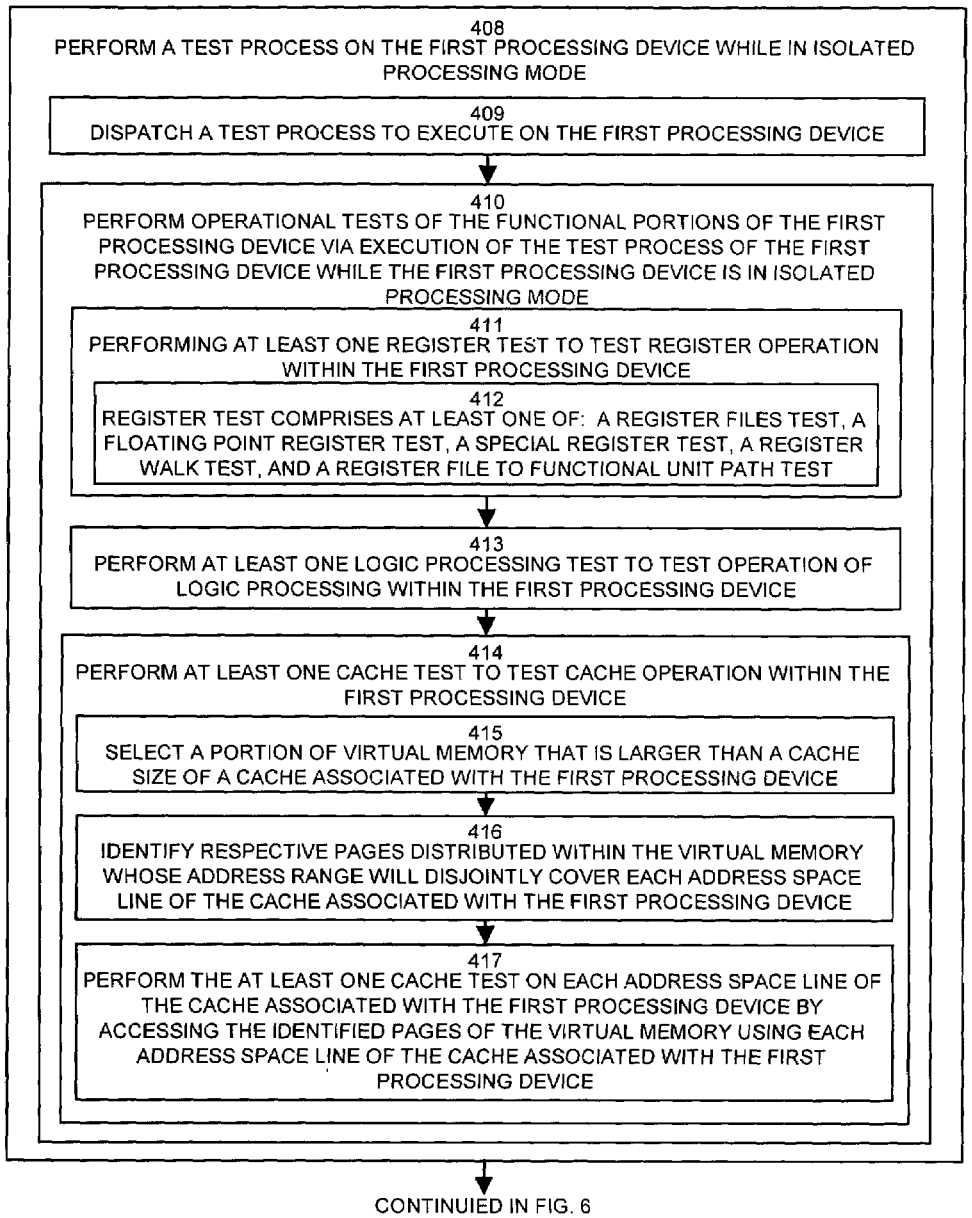
Figure 6:
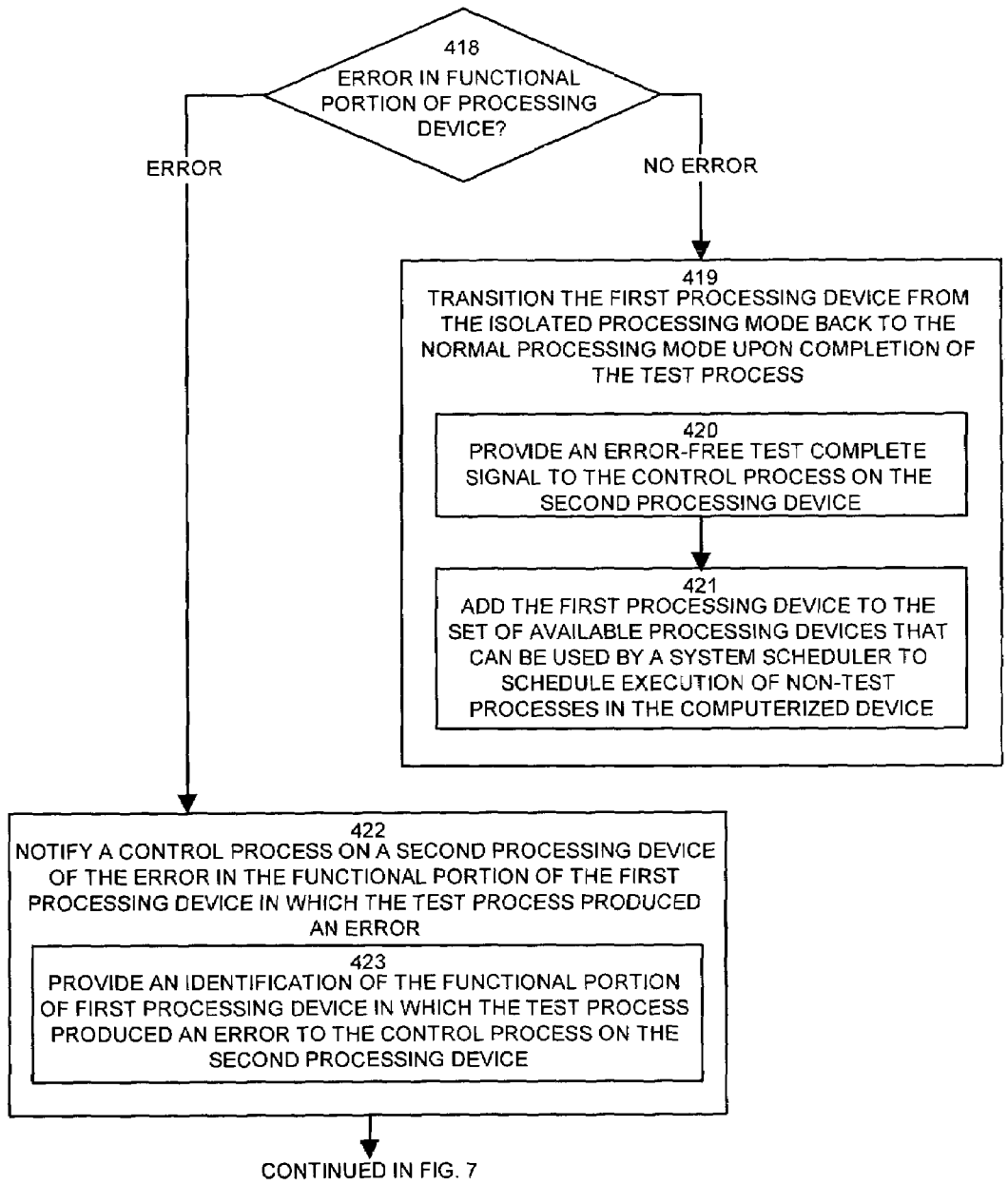

FIGS. 4 through 6 are a flow chart of processing steps that show details of the testing operations of various embodiments of the invention as disclosed herein.

In step 400, the computerized device 100 operates the first processing device in a normal processing mode, in a manner similar to that explained in step 300 above.

In step 401, the normal processing mode includes executing at least one non-test process 158 on the first processing device 110 for a period of time (e.g., safe period 253) that is less than or equal to a mean time between failure of devices equivalent to the first processing device 110.

Alternatively, in step 402, the first processing device 100 operates in normal processing mode until detection of a test begin event as explained above.

Next, in step 403 the computerized device 100 operates to transition the first processing device 110 from the normal processing mode to an isolated processing mode.

As explained in step 404, this is accomplished in this example embodiment of the invention by operating the control process 130 on the second processing device 120 to transition the first processing device 110 to the isolated processing mode.

More specifically, in step 405, the control process 130 is operable to migrate 202 non-test processes 158 off of the first processing device 110 until no more non-test processes 158 are executing on the first processing device 110.

Next, in step 406 the control process instructs the system scheduler 156 to remove the first processing device 110 from a set of available processing devices used by a system scheduler 156 to schedule execution of non-test processes 158 in the computerized device 110. In this manner, this embodiment of the invention causes isolation of the first processing device 110 by instructing the system scheduler 156 to no longer schedule any non-test processes 158 for execution upon the first processing device 110.

Next, in step 407 the control process 130 instructs an interrupt handler (e.g., associated with the first processing device 110 or associated with each migrated non-test process 158) to direct interrupts associated with non-test threads 158 that were executing on the first processing device 110 to (be directed to) other processing devices 120 in the set of available processing devices that are scheduled to execute the non-test threads 158 that were executing on the first processing device 110. Accordingly, any interrupts that may be outstanding for the migrated not-test processes 158 will now be directed to the appropriate other processing devices 120 in order to maintain the first processing device 110 in an isolated processing mode.

After processing step 407, processing proceeds to step 408 in a flow chart of processing steps beginning at the top of FIG. 5.

FIG. 5 is a continuation of the flow chart of processing steps from step 407 in FIG. 4.

In step 408, the computerized device 100 performs the test process 140 on the first processing device 110 while in isolated processing mode to test the functional portions 115 of the first processing device 110.

In step 409, this includes the control process 130 dispatching or otherwise invoking 203 (FIG. 1) the test process 140 to execute on the first processing device 110.

In step 410, testing the functional portions 115 of the first processing device 110 includes performing operational tests on the functional portions 115 of the first processing device 110 via execution of the test process 140 on the first processing device 110 while the first processing device 110 remains operating in isolated processing mode such that no non-test processes 158 execute during operation of the test process 140.

In step 411, testing includes performing at least one register test to test register operations within the first processing device 110.

As shown in sub-step 412, the register tests can comprise at least one or more of the following: a register files test, a floating point register test, a special register tests, a register walk test and a register file to functional unit path test. Such tests can perform exhaustive testing of various aspects of registers existing within the first processing device 110. As an example, a register files test can include a register window integer register files test in which the test process 140 tests a register window comprising a set of "in", "local" and "out" registers as well as global registers and the like. In addition, special-purpose registers such as version registers and thread registers and other architectural registers such as stack pointers and program counters can be tested as well. It is to be understood that in sub-step 412, any type of test regarding the proper functionality of registers within a processing device is intended to be covered by embodiments of the invention.

Next, in step 413 the test process 140 operating in the first processing device 110 performs at least one logic processing test to test operation of logic processing within the first processing device. This can include, for example, testing the arithmetic logic unit functional portions 115-1 to ensure that arithmetic and other functional logic properly operates within the processing device 110.

Next, in step 414, the test process 140 performs at least one cache test to test cache operation within the first processing device 110.

In step 415, performing the cache tests can include the test process 140 selecting a portion of virtual memory that is larger than a cache size of a cache 115-M associated with the first processing device 110. It may be the case, for example, that the processing device 110 includes a cache 115-M of a certain size such as 4 MB or 8 MB of memory. For an example 8 MB physically indexed cache having a 64 byte cache line, there are 128K cache lines present within the cache. Since memory 150 is shared with other processing devices, it may be difficult for the test process 140 to allocate a contiguous 8 MB portion of the memory 150 to be able to test the cache 115-M. Accordingly, in step 415, the test process 140 selects a portion of virtual memory that is larger than the size of the cache. As an example, the test process 140 can select physical pages scattered across the memory system 150 such that each physical page covers an address space represented by each line of the cache 115-M. Specifically, by selecting an amount of virtual memory that is three times the size of the cache, individual pages across this virtual memory range can be selected whose address will disjointly cover all lines of the cache.

To do so, in step 416 the test process 140 identifies respective pages distributed within the virtual memory whose address range will disjointly cover each address space line of the cache 115-M associated with the first processing device 110.

Using this memory, in step 417 the test process 140 performs the cache test on each address space line of the cache associated with the first processing device by accessing the identified pages of the virtual memory using each address space line of the cache associated with the first processing device. Stated differently, by acquiring an amount of virtual memory that is three times the size of the onboard cache 115-M of the first processing device 110, and then selecting physical pages whose address will disjointly cover all lines of the cache and then freeing the rest of the virtual memory, the cache test can be performed such that each line of the cache will represent a disjoint page of memory 150 and thus the test process 140 can test the entire cache functional portion 115-M for errors.

After processing of step 417 is complete, processing proceeds to step 418 at the top of the flow chart beginning in FIG. 6.

FIG. 6 is a flow chart of processing steps that continues processing from step 417 in FIG. 5.

In step 418, the test process 140 determines whether or not the error occurred in a particular functional portion 115 of the first processing device 110. If an error did not occur, processing proceeds to step 419.

In step 419, the test process 140 in conjunction with the control process 130 transitions the first processing device 110 from the isolated processing mode back to the normal processing mode and completes operation of the test process 140.

In particular, in step 420, to transition from the isolated processing mode back to the normal processing mode in the case of no errors, the test process 140 provides an error-free test complete signal 206 to the control process 130 operating in the second processing device 120-1. This indicates to the control process 130 that no faults or errors were detected within the functional portions 115 of the first processing device 110.

Thereafter, in step 421 the control process 130 adds the first processing device 110 back to the set of available processing devices that can be used by the system scheduler 156 to schedule execution of non-test process is 158 within the computerized device 100. In this manner, after testing is complete the first processing device 110 can again begin to assist in sharing the load of execution of non-test processes 158 since it is now included in the set of available processors 110 and 120.

Returning attention now back to step 418, if the test process 140 does detect an error or fault within one or more functional portions 115 of the first processing device 110, processing proceeds to step 422.

In step 422, the test process 140, upon detecting an error in the functional portion 115, notifies the control process 130 on the second processing device 121 of the error within the functional portion 115 of the first processing device in which the test process 140 to produce the error or fault.

In particular, in step 423 the test process 140 provides an identification of the functional portion 115 of the first processing device 110 in which the test process 140 produce the error. As a result of this processing step, the control process 130 can log or otherwise store or transmit information concerning the faulted functional portion 115 of the first processing device 110. This can include transmitting this information to a systems administrator of the computerized device 100 in order to notify this person of the error. Other steps the control process 130 can take at this time can include activating a secondary to reserve a processing device in order to take the place of the faulted first processing device 110. Further details and continued processing operations performed within step 422 to notify the control process 130 of the error in the functional portion 115 of the first processing device 110 will be discussed with respect to the flow chart of processing steps shown in FIG. 7.

Figure 7:
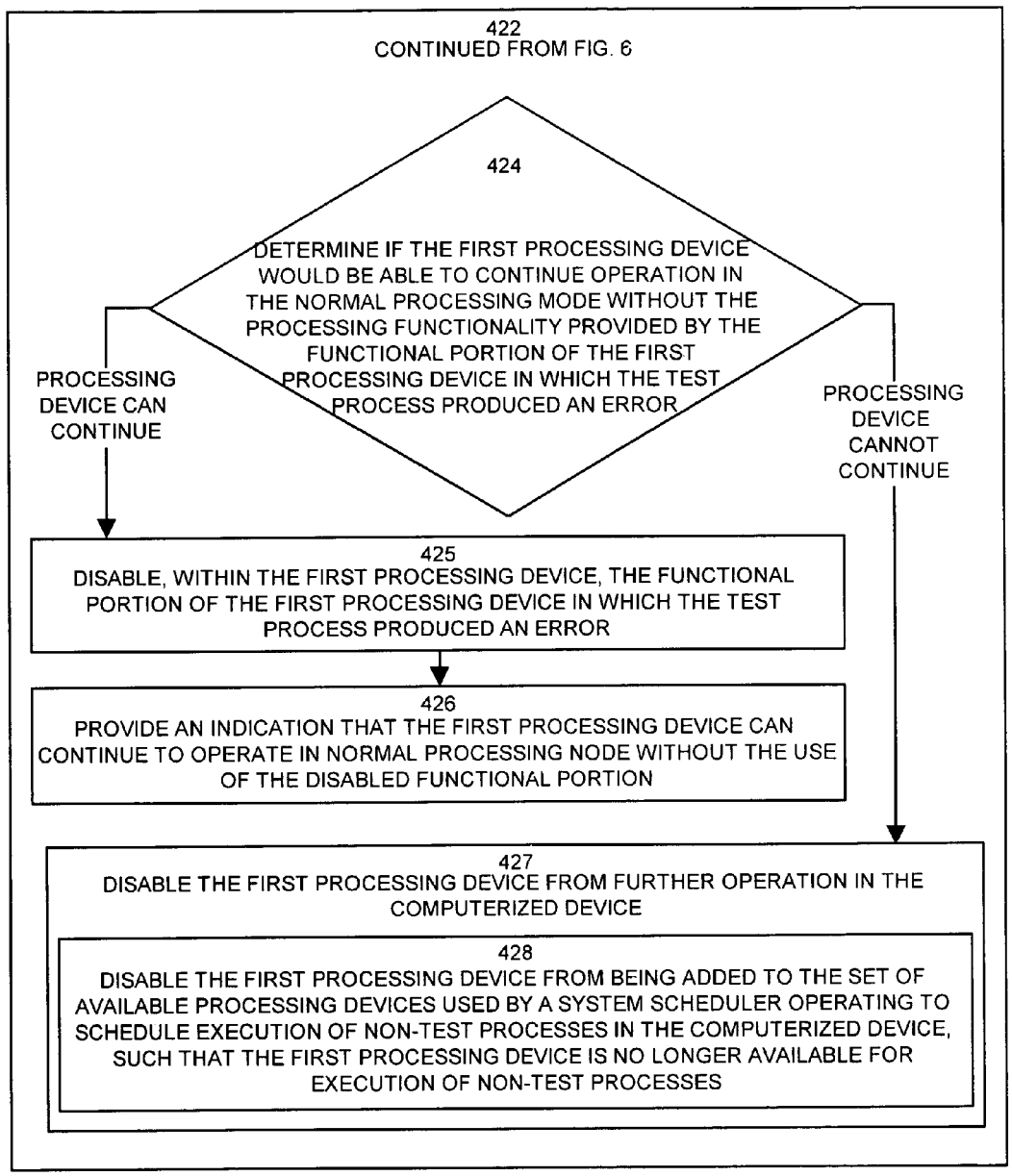

FIG. 7 is a flow chart of processing steps that continues the description of processing associated with step 422 from FIG. 6.

In step 424, after detecting the error within one or more functional portions 115 of the first processing device 110, the test process 140 determines if the first processing device 110 would be able to continue operation in the normal processing mode without the processing functionality provided by the functional portion 115 of the first processing device 110 in which the test process 140 produce the error. In other words, in step 424, the test process 140 (or alternatively the control process 130 based upon the identification 206 of the faulted functional component 115) determines whether or not the first processing device 110 should continue operation and reenter normal processing mode without the use of defaulted functional portion 115. The decision that the test process 140 or the control process 130 makes in step 424 can be based on a variety of factors.

As an example, if the functional portion 115 contained only a minor fault that can be easily isolated by disabling some or all of the functional portion 115 without significantly adversely impacting the overall operation of the first processing device 110, then it might make sense for the test process 140 to not completely disable the first processing device 110 entirely. In step 424, if the test process 140 determines that would be acceptable to continue operation in the normal processing mode without the processing functionality provided by defaulted functional portion 115, processing proceeds to step 425.

In step 425, the test process 140 disables, within the first processing device 110, the functional portion 115 of the first processing device in which the test process 140 produce the error or fault. This may include disabling some or all of the functional processing circuitry. In other words, in step 425 the test process 140 deactivates, isolates or otherwise disables some or all of the particular functional portion 115 which was discovered by the test process 140 during testing to not be operating properly.

Next, in step 426 the test process 140 provides an indication 206 to the control process 130 that the first processing device 110 can effectively continue to operate in normal processing mode without the use of the disabled functional portion 115. In this manner, embodiments of the invention allow a test process that discovers a minor or non-compromising fault within a functional portion 115 of the first processing device 110 to disable or otherwise isolate the functional portion 115 (or just a part of the functional portion) while allowing the overall operation of the first processing device 110 to reenter normal processing mode in order to continue processing non-test processes 158.

Returning attention to step 424, if the test process 140 determines that the first processing device 110 would not be able to continue operation in the normal processing mode without the use of the processing functionality provided by the functional portion 115 in which the test process 140 produced or detected an error, then processing proceeds to step 427.

In step 427, the test process 140 disables the entire first processing device 110 from further operation in the computerized device 100. Accordingly, if the functional portion 115 was required for proper operation of the processing device 110, then in step 427 the test process 140 disables operation of this processing device 110 such that no further non-test processes 158 will run or execute within the first processing device 110 since those test processes could possibly be affected by the faulted operation of the functional portion 115 in which the error was detected.

Specifically, in step 428, the test process 140 disables the first processing device 110 from being added to a set of available processing devices used by the system scheduler 156 that operates to schedule execution of non-test processes 158 in the computerized device, such that the first processing device 110 is no longer available for execution of non-test processes 158.

Accordingly, this example embodiment of the invention is able to perform testing of various functional portions 115 of the processing device 110 and if the test process 140 determines that the fault or error detected within the functional portion 115 is severe enough to warrant disabling of the first processing device 110, the test process 140 can do so and can notify 206 the control process 130 of such action.

It is to be understood that the aforementioned processing operations can be performed by a test process 140 operating in any one of the processing devices 110 or 121 through 120-N. While one processing device 110 or 120-1 through 120-N operates the test process 140, another processing device can operate the control process 130. The control process 130 can migrate itself (the operating system can migrate this process 130) from processing device to processing device in a round robin manner in the event that the particular processing device upon which the control process 130 is currently executing is next scheduled to perform the test process 140. In other words, as illustrated in FIG. 1, if the next processing device to be tested according to embodiments of the invention is the processing device 120-1, then upon completion of testing of the first processing device 110, the control process 130 can migrate or otherwise cause itself to be restarted upon another processing device (e.g., 120-2) such that the second processing device 121 can transition from normal processing mode to isolated processing mode for execution of a corresponding test process 140. In this manner, all processing devices within the computerized device 100 can be tested according to embodiments of the invention.

Also as noted above, the testing as explained above can either be performed at periodic intervals separated by periods of elapsed time that are preferably less than or equal to the average amount of time during which a processing device experiences a failure in a high-availability environment, or alternatively, the testing as explained above can continually be performed such that there is always at least one processing device within the computerized device 100 that is undergoing operation of the test process 140 in isolated processing mode. In such a configuration, referred to above as the "N+1 configuration", it is preferable that there be a significant number of processing devices available to handle the required load of non-test processes 158.

From the aforementioned discussion, it is to be understood that embodiments of the invention implement unique mechanisms and techniques for testing processing devices in a computerized device. Those skilled in the art will understand that there can be many variations made to the embodiments explained above while still achieving the same objective of those embodiments and the invention in general. As an example, the specific processing steps discussed above can be rearranged in different orders while still achieving the same overall result as provided by embodiments of the invention. Further still, embodiments of the invention are not limited to testing only microprocessors in a multiprocessing computerized device. Rather, the processing devices can be any type of components that contain function portions 115 of processing circuitry and can even include the memory system 150, in which case the test process 140 would execute on a processor and a portion of the memory 150 could be tested, leaving other portions for use by non-test processes. Other processing devices that can be isolated and tested in this manner include peripheral components such as storage systems, circuit board cards, systems boards (e.g., motherboards, cpu and memory boards, etc.), special purpose processors such as Application Specific Integrated Circuits (ASICs), Field Programmable Gate Arrays (FPGAs), and the like. Accordingly, embodiments of the invention are not intended to be limiting to the aforementioned discussion and equivalents to the aforementioned processing steps are intended to be included as embodiments of the invention.

What is claimed is:

1. In a computerized device having a first processing device, a second processing device, and an interconnection mechanism allowing communication between the first and second processing devices, a method for testing a processing device, the method comprising:

operating the first processing device in a normal processing mode;

transitioning the first processing device from the normal processing mode to an isolated processing mode;

performing a test process on the first processing device while in isolated processing mode to test functional portions of the first processing device, wherein the test process is repeated on the first processing device after one or more periodic intervals of time, the duration of the intervals being less than or equal to a mean time between failure of devices equivalent to the first processing device; and if operation of the test process produces an error in a functional portion of the first processing device, notifying a control process on a second processing device of the error in the functional portion of the first processing device in which the test process produced an error;

if operation of the test process does not produce an error in the functional portions of the first processing device, transitioning the first processing device from the isolated processing mode back to the normal processing mode upon completion of the test process;

wherein the first and second processing devices are central processing units of a plurality of central processing units in the computerized device that is configured with N+I central processing units; and wherein testing operations of operating in a normal processing mode, transitioning to an isolated processing mode performing the test process, notifying a control process and transitioning back to the normal processing mode are repeatedly performed for each respective central processing unit in a constant manner during a testing time assigned to that central processing unit, such that there can be N central processing units operating in normal processing mode while one processing unit is operating the test process in isolated processing mode.

2. The method of claim 1 wherein operating the first processing device a normal processing mode comprises:

executing at least one non-test process on the first processing device for a period of time that is less than or equal to a mean time between failure of devices equivalent to the first processing device.

3. The method of claim 2 wherein transitioning the first processing device from the normal processing mode the isolated processing mode comprises:

operating the control process on the second processing device to transition the first processing device to the isolated processing mode.

4. The method of claim 3 wherein operating the control process on the second processing device to transition the first processing device to the isolated processing mode comprises:

migrating non-test processes off of the first processing device until no more non-test processes are executing on the first processing device;

removing the first processing device from a set of available processing devices used by a system scheduler to schedule execution of non-test processes in the computerized device; and instructing an interrupt handler to direct interrupts associated with non-test threads that were executing on the first processing device to other processing devices in the set of available processing devices that are scheduled to execute the non-test threads that were executing on the first processing device.

5. The method of claim 4 wherein if operation of the test process does not produce an error in the functional portions of the first processing device, transitioning the first processing device from the isolated processing mode back to the normal processing mode upon completion of the test process comprises:

providing an error-free test complete signal to the control process on the second processing device; and adding the first processing device to the set of available processing devices that can be used by a system scheduler to schedule execution of non-test processes in the computerized device.

6. The method of claim 3 wherein performing a test process on the first processing device while in isolated processing mode to test functional portions of the first processing device comprises:

dispatching a test process to execute on the first processing device; and performing operational tests of the functional portions of the first processing device via execution of the test process of the first processing device while the first processing device is in isolated processing mode.

7. The method of claim 6 wherein performing operational tests on the functional portions of the first processing device via execution of the test process comprises:

performing at least one register test to test register operation within the first processing device;

performing at least one logic processing test to test operation of logic processing within the first processing device; and performing at least one cache test to test cache operation within the first processing device.

8. The method of claim 7 wherein the at least one register test comprises at least one of: a register files test, a floating point register test, a special register test, a register walk test, and a register file to functional unit path test.

9. The method of claim 7 wherein performing at least one cache test to test cache operation within the first processing device comprises:

selecting a portion of virtual memory that is larger than a cache size of a cache associated with the first processing device;

identifying respective pages distributed within the virtual memory hose address range will disjointly cover each address space line of the cache associated with the first processing device; and performing the at least one cache test on each address space line of the cache associated with the first processing device by accessing the identified pages of the virtual memory using each address space line of the cache associated with the first processing device.

10. The method of claim 6 wherein if operation of the test process produces an error in a functional portion of the first processing device, notifying a control process on a second processing device of the error in the functional portion of the first processing device in which the test process produced an error comprises:
providing an identification of the functional portion of first processing device in which the test process produced an error to the control process on the second processing device.

11. The method of claim 10 wherein notifying a control process on second processing device of the error in the functional portion of the first processing device in which the test process produced an error comprises:
disabling the first processing device from further operation in the computerized device.

12. The method of claim 11 wherein disabling the first processing device from further operation in the computerized device comprises
disabling the first processing device from being added to the set of available processing devices used by a system scheduler operating to schedule execution of non-test processes in the computerized device, such that the first processing device is no longer available for execution of non-test processes.

13. The method of claim 10 wherein notifying a control process on second processing device of the error in the functional portion of the first processing device in which the test process produced an error comprises:
determining if the first processing device would be able to continue operation in the normal processing mode without the processing functionality provided by the functional portion of the first processing device in which the test process produced an error, and if the first processing device would be able to continue operation in the normal processing mode without the processing functionality provided by the functional portion of the first processing device in which the test process produced an error, then:
i) disabling, within the first processing device, the functional portion of the first processing device in which the test process produced an error; and
ii) providing an indication that the first processing device can continue to operate in normal processing node without the use of the disabled functional portion; and if the first processing device would not be able to continue operation in the normal processing mode without the processing functionality provided by the functional portion of the first processing device in which the test process produced an error, then:
disabling the first processing device from further operation in the computerized device.

14. The method of claim 1 wherein the first and second processing devices are central processing units in the computerized device and wherein testing operations of operating in a normal processing mode, transitioning to an isolated processing mode, performing the test process, notifying a control process and transitioning back to the normal processing mode are repeatedly performed automatically for each respective processing device in the computerized device according to a testing schedule after routine power-up of the computerized device and after operation in normal processing mode during which time the computerized device has executed non-boot programs including at least one user process.

15. The method of claim 14 wherein the testing schedule causes the testing operations to be performed on each central processing unit of the computerized device repeatedly and automatically and wherein successive periodic sequences of testing operations are performed between periods of time that are less than or equal to a meantime between failure of devices equivalent to the central processing units of the computerized device.

16. The method of claim 1 wherein testing operations of operating in normal processing mode, transitioning to an isolated processing mode, performing the test process, notifying a control process and transitioning back to the normal processing mode are performed in response to detecting a test begin event.

17. The method of claim 1 comprising:
if operation of the test process produces an error in a functional portion of the first processing device, after each functional portion of the first processing device has been tested, notifying a control process on a second processing device of the error in the functional portion of the first processing device in which the test process produced an error; and
if operation of the test process does not produce an error in the functional portions of the first processing device, after each functional portion of the first processing device has been tested, transitioning the first processing device from the isolated processing mode back to the normal processing mode upon completion of the test process.

18. A computerized device comprising:
a first processing device;
a second processing device;
a memory system; and
an interconnection mechanism allowing communication between the first and second processing devices and the memory system; and
wherein the computerized device tests the first processing device by performing the operations of:
operating the first processing device in a normal processing mode;
transitioning the first processing device from the normal processing mode to an isolated processing mode;
performing a test process on the first processing device while in isolated processing mode to test functional portions of the first processing device, wherein the test process is repeated on the first processing device after one or more periodic intervals of time, the duration of the intervals being less than or equal to a mean time between failure of devices equivalent to the first processing device; and
if operation of the test process produces an error in a functional portion of the first processing device, notifying a control process on a second processing device of the error in the functional portion of the first processing device in which the test process produced an error;
if operation of the test process does not produce an error in the functional portions of the first processing device, transitioning the first processing device from the isolated processing mode back to the normal processing mode upon completion of the test process;
wherein the first and second processing devices are central processing units of a plurality of central processing units in the computerized device that is configured with N+I central processing units; and wherein testing operations of operating in a normal processing mode, transitioning to an isolated processing mode, performing the test process, notifying a control process and transitioning back to the normal processing mode are repeatedly performed for each respective central processing unit in a constant manner during a testing time assigned to that central processing unit, such that there can be N central processing units operating in normal processing mode while one processing unit is operating the test process in isolated processing mode.

19. The computerized device of claim 18 wherein operating the first processing device in a normal processing mode comprises:

executing at least one non-test process on the first processing device for a period of time that is less than or equal to a meantime between failure of devices equivalent to the first processing device.

20. The computerized device of claim 19 wherein transitioning the first processing device from the normal processing mode the isolated processing mode comprises:

operating the control process on the second processing device to transition the first processing device to the isolated processing mode.

21. The computerized device of claim 20 wherein operating the control process on the second processing device to transition the first processing device to the isolated processing mode comprises:

migrating non-test processes off of the first processing device until no more non-test processes are executing on the first processing device;

removing the first processing device from a set of available processing devices used by a system scheduler to schedule execution of non-test processes in the computerized device; and instructing an interrupt handler to direct interrupts associated with non-test threads that were executing on the first processing device to other processing devices in the set of available processing devices that are scheduled to execute the non-test threads that were executing on the first processing device.

22. The computerized device of claim 21 wherein if operation of the test process does not produce an error in the functional portions of the first processing device, transitioning the first processing device from the isolated processing mode back to the normal processing mode upon completion of the test process comprises:

providing an error-free test complete signal to the control process on the second processing device; and adding the first processing device to the set of available processing devices that can be used by a system scheduler to schedule execution of non-test processes in the computerized device.

23. The computerized device of claim 20 wherein performing a test process on the first processing device while in isolated processing mode to test functional portions of the first processing device comprises:

dispatching a test process to execute on the first processing device; and performing operational tests of the functional portions of the first processing device via execution of the test process of the first processing device while the first processing device is in isolated processing mode.

24. The computerized device of claim 23 wherein performing operational tests on the functional portions of the first processing device via execution of the test process comprises:

performing at least one register test to test register operation within the first processing device;

performing at least one logic processing test to test operation of logic processing within the first processing device; and performing at least one cache test to test cache operation within the first processing device.

25. The computerized device of claim 24 wherein the at least one register test comprises at least one of:

a register files test, a floating point register test, a special register test, a register walk test, and a register file to functional unit path test.

26. The computerized device of claim 24 wherein performing at least one cache test to test cache operation within the first processing device comprises:

selecting a portion of virtual memory at is larger than a cache size of a cache associated with the first processing device;

identifying respective pages distributed within the virtual memory whose address range will disjointly cover each address spaceline of the cache associated with the first processing device; and performing the at least one cache test on each address space line of the cache associated with the first processing device by accessing the identified pages of the virtual memory using each address space line of the cache associated with the first processing device.

27. The computerized device of claim 23 wherein if operation of the test process produces an error in a functional portion of the first processing device, notifying a control process on a second processing device of the error in the functional portion of the first processing device in which the test process produced an error comprises:

providing an identification of the functional portion of first processing device in which the test process produced an error to the control process on the second processing device.

28. The computerized device of claim 27 wherein notifying a control process on a second processing device of the error in the functional portion of the first processing device in which the test process produced an error comprises:

disabling the first processing device from further operation in the computerized device.

29. The computerized device of claim 28 wherein disabling the first processing device from further operation in the computerized device comprises disabling the first processing device from being added to the set of available processing devices used by a system scheduler operating to schedule execution of non-test processes in the computerized device, such that the first processing device is no longer available for execution of non-test processes.

30. The computerized device of claim 27 wherein notifying a control process on a second processing device of the error in the functional portion of the first processing device in which the test process produced an error comprises:

determining if the first processing device would be able to continue operation in the normal processing mode without the processing functionality provided by the functional portion of the first processing device in which the test process produced an error, and if the first processing device would be able to continue operation in the normal processing mode without the processing functionality provided by the functional portion of the first processing device in which the test process produced an error, then:

i) disabling, within the first processing device, the functional portion of the first processing device in which the test process produced an error; and ii) providing an indication that the first processing device can continue to operate in normal processing node without the use of the disabled functional portion; and if the first processing device would not be able to continue operation in the normal processing mode without the processing functionality provided by the functional portion of the first processing device in which the test process produced an error, then: disabling the first processing device from further operation in the computerized device.

31. The computerized device of claim 18 wherein the first and second processing devices are central processing units in the computerized device and wherein testing operations of operating in a normal processing mode, transitioning to an isolated processing mode, performing the test process,
    notifying a control process and transitioning back to the normal processing mode are repeatedly performed automatically for each respective processing device in the computerized device according to a testing schedule after routine power-up of the computerized device and after operation in normal processing mode during which time the computerized device has executed non-boot programs including at least one user process.

32. The computerized device of claim 31 wherein the testing schedule causes the testing operations to be performed on each central processing unit of the computerized device repeatedly and automatically and wherein successive periodic sequences of testing operations are performed between periods of time that are less than or equal to a meantime between failure of devices equivalent to the central processing units of the computerized device.

33. The computerized device of claim 18 wherein testing operations operating in a normal processing mode, transitioning to an isolated processing mode, performing the test process, notifying a control process and transitioning back to the normal processing mode are performed in response to detecting a test begin event.

34. A computerized device comprising:
    a first processing device;
    a second processing device;
    a memory system; and
    an interconnection mechanism allowing communication between the first and second processing devices and the memory system; and wherein the computerized device includes a means for testing processing devices, such means comprising:
    means for operating the first processing device in a normal processing mode;
    means for transitioning the first processing device from the normal processing mode to an isolated processing mode;
    means for performing a test process on the first processing device while in isolated processing mode to test functional portions of the first processing device, wherein the test process is repeated on the first processing device after one or more periodic intervals of time, the duration of the intervals being less than or equal to a mean time between failure of devices equivalent to the first processing device; and
    means for determining if operation of the test process produces an error in a functional portion of the first processing device, and if so, means for notifying a control process on a second processing device of the error in the functional portion of the first processing device in which the test process produced an error;
    means for determining if operation of the test process does not produce an error in the functional portions of the first processing device, and if so, means for transitioning the first processing device from the isolated processing mode back to the normal processing mode upon completion of the test process;
    wherein the first and second processing devices are central processing units of a plurality of central processing units in the computerized device that is configured with N+1 central processing units; and
    wherein means for testing operations of operating in a normal processing mode,
    transitioning to an isolated processing mode, performing the test process, notifying a control process and transitioning back to the normal processing mode are repeatedly performed for each respective central processing unit in a constant manner during a testing time assigned to that central processing unit, such that there can be N central processing units operating in normal processing mode while one processing unit is operating the test process in isolated processing mode.

35. A computer readable medium including computer program logic encoded thereon that when executed in a computerized device having a first processing device, a second processing device, and an interconnection mechanism allowing communication between the first and second processing devices, provides a mechanism for testing a processing device by performing the operations of:
    operating the first processing device in a normal processing mode; transitioning the first processing device from the normal processing mode to an isolated processing mode;
    performing a test process on the first processing device while in isolated processing mode to test functional portions of the first processing device, wherein the test process is repeated on the first processing device after one or more periodic intervals of time, the duration of the intervals being less than or equal to a mean time between failure of devices equivalent to the first processing device; and
    if operation of the test process produces an error in a functional portion of the first processing device, notifying a control process on a second processing device of the error in the functional portion of the first processing device in which the test process produced an error;
    if operation of the test process does not produce an error in the functional portions of the first processing device, transitioning the first processing device from the isolated processing mode back to the normal processing mode upon completion of the test process;
    wherein the first and second processing devices are central processing units of a plurality of central processing units in the computerized device that is configured with N+1 central processing units; and wherein testing operations of operating in a normal processing mode, transitioning to an isolated processing mode, performing the test process, notifying a control process and transitioning back to the normal processing mode are repeatedly performed for each respective central processing unit in a constant manner during a testing time assigned to that central processing unit, such that there can be N central processing units operating in normal processing mode while one processing unit is operating the test process in isolated processing mode.

\* \* \* \* \*

UNITED STATES PATENT AND TRADEMARK OFFICE
CERTIFICATE OF CORRECTION

| | | |
|---|---|---|
| PATENT NO. | : 7,509,533 B1 | Page 1 of 1 |
| APPLICATION NO. | : 10/610182 | |
| DATED | : March 24, 2009 | |
| INVENTOR(S) | : Hariprakash Govindarajalui | |

It is certified that error appears in the above-identified patent and that said Letters Patent is hereby corrected as shown below:

Column 17, Line 41, Claim 13:

Delete "node" and insert -- mode --.

Column 20, Line 7, Claim 26:

Delete "at" and insert -- that --.

Signed and Sealed this

Twenty-sixth Day of May, 2009

JOHN DOLL
*Acting Director of the United States Patent and Trademark Office*